US012755591B2

(12) United States Patent
Kinwar et al.

(10) Patent No.: US 12,755,591 B2
(45) Date of Patent: Oct. 6, 2026

(54) IMAGE DATA ENABLED ACCESS CONTROL SYSTEMS AND METHODS

(71) Applicant: THE CHAMBERLAIN GROUP LLC, Oak Brook, IL (US)

(72) Inventors: Jishnu Kinwar, Lisle, IL (US); Jonathan Lee, La Grange, IL (US); Christopher Richard Selle, La Grange, IL (US); Eric Rodriguez, Decatur, GA (US)

(73) Assignee: THE CHAMBERLAIN GROUP, LLC, Oak Brook, IL (US)

( * ) Notice: Subject to any disclaimer, the term of this patent is extended or adjusted under 35 U.S.C. 154(b) by 0 days.

(21) Appl. No.: 18/627,852

(22) Filed: Apr. 5, 2024

(65) Prior Publication Data

US 2024/0338985 A1 Oct. 10, 2024

Related U.S. Application Data

(60) Provisional application No. 63/458,046, filed on Apr. 7, 2023.

(51) Int. Cl.

| | |
|---|---|
| ***G07C 9/10*** | (2020.01) |
| ***G06V 10/25*** | (2022.01) |
| ***G06V 20/40*** | (2022.01) |
| ***G06V 40/10*** | (2022.01) |
| ***G06V 40/20*** | (2022.01) |
| ***G07C 9/37*** | (2020.01) |

(52) U.S. Cl.

CPC ............... *G07C 9/10* (2020.01); *G06V 10/25* (2022.01); *G06V 20/44* (2022.01); *G06V 40/103* (2022.01); *G06V 40/20* (2022.01); *G07C 9/37* (2020.01)

(58) Field of Classification Search

CPC ...... G06V 40/20; G06V 40/103; G06V 20/44; G06V 40/25; G06V 40/45; G06V 40/10; G07C 9/10; G07C 9/37

USPC .......................................................... 235/93

See application file for complete search history.

(56) References Cited

U.S. PATENT DOCUMENTS

| | | | | |
|---|---|---|---|---|
| 11,024,104 | B2 * | 6/2021 | Gaddam | G07B 15/00 |
| 11,962,701 | B2 * | 4/2024 | Mondello | H04W 4/023 |
| 2016/0178593 | A1 * | 6/2016 | Miller | H04N 23/56<br>382/191 |
| 2018/0108228 | A1 * | 4/2018 | Lovejoy | G08B 13/08 |

(Continued)

*Primary Examiner* — Daniel St Cyr

(74) *Attorney, Agent, or Firm* — Dority & Manning, P.A.

(57) ABSTRACT

A method of initiating an auto-secure operation associated with a movable barrier operator, the method including: capturing, via a camera system, image data associated with a region of interest associated with the camera system; processing, via a processor, the image data to determine whether a person is present in the image data; transmitting a person detection signal from the processor to an access control platform component based on determining the person is present in the image data; formulating, by the access control platform component, a person detected notification in response to receiving the person detection signal; transmitting the person detected notification to a user device; and initiating, by the access control platform component in response to receiving the person detection signal, an auto-secure operation including sending a close command to a movable barrier operator to cause the movable barrier operator to close a movable barrier.

20 Claims, 12 Drawing Sheets

(56) References Cited

U.S. PATENT DOCUMENTS

| | | | | |
|---|---|---|---|---|
| 2018/0245395 | A1* | 8/2018 | Huggins | E05F 15/76 |
| 2018/0308328 | A1* | 10/2018 | Siminoff | G08B 13/1961 |
| 2018/0349708 | A1* | 12/2018 | van Hoof | G08B 13/19684 |
| 2019/0063140 | A1* | 2/2019 | Trundle | G07C 9/00571 |
| 2019/0145738 | A1* | 5/2019 | Chae | G06T 7/70 89/41.05 |
| 2019/0325681 | A1* | 10/2019 | Bresson | G05B 13/024 |
| 2020/0105078 | A1* | 4/2020 | Nguyen | G07C 9/00904 |
| 2020/0235946 | A1* | 7/2020 | Lee | H04L 9/3268 |
| 2021/0209881 | A1* | 7/2021 | Lemberger | G07C 9/00896 |
| 2022/0044562 | A1* | 2/2022 | Schaak | H04R 3/00 |
| 2022/0327881 | A1* | 10/2022 | Ivarson | H04N 23/61 |

* cited by examiner

IMAGE DATA ENABLED ACCESS CONTROL SYSTEMS AND METHODS

CROSS-REFERENCE TO RELATED APPLICATIONS

The present application claims priority to U.S. Provisional Patent Application 63/458,046 filed on Apr. 7, 2023, the disclosure of which is incorporated by reference herein in its entirety.

TECHNICAL FIELD

This disclosure relates to access control systems and, more specifically, to access control systems that utilize image data as an input to the access control system.

BACKGROUND

Access control systems are known, including smart lock-set systems and movable barrier operators, to control access to a secured area such as a residence. Some access control systems utilize a camera to capture images or video of one or more monitored areas outside of the secured area, such as lawn, driveway, and/or alley by the residence. The access control system may initiate an alarm and/or communicate an alert or a notification to a portable electronic device, such as a smartphone, of a user associated with the residence upon the access control system detecting a security event such as person entering the monitored area.

BRIEF DESCRIPTION

Aspects and advantages of the invention in accordance with the present disclosure will be set forth in part in the following description, or may be obvious from the description, or may be learned through practice of the technology.

In accordance with one embodiment, a method of initiating an auto-secure operation associated with a movable barrier is provided. The method includes capturing, via a camera system, image data associated with a region of interest associated with the camera system; processing, via a processor, the image data to determine whether a person is present in the image data; transmitting a person detection signal from the processor to an access control platform component based on determining the person is present in the image data; formulating, by the access control platform component, a person detected notification in response to receiving the person detection signal; transmitting the person detected notification to a user device; and initiating, by the access control platform component in response to receiving the person detection signal, an auto-secure operation including sending a close command to a movable barrier operator to cause the movable barrier operator to close a movable barrier associated with the movable barrier operator.

In accordance with another embodiment, a non-transitory computer-readable medium storing instructions which, when executed by a processor, cause performance of a method of initiating an auto-secure operation of a movable barrier operator is provided. The method includes receiving, at an access control platform component, a person detection signal indicative of a person within a region of interest near a movable barrier operator, wherein the person detection signal is determined in view of image data captured by a camera system; initiating, by the access control platform component, an auto-secure operation upon receipt of the person detection signal, wherein initiating the auto-secure operation comprises: formulating, by the access control platform component, a person detected notification; transmitting the person detected notification to a user device; and sending a close command to the movable barrier operator to cause the movable barrier operator to close a movable barrier associated with the movable barrier operator.

In accordance with another embodiment, a camera subsystem for use with a movable barrier operator is provided. The camera subsystem includes a camera system that receives a camera system input selected from a group including an environment input, a power input, an ambient lighting input, a visual input, an audio input, and a motion input; and a server subsystem, wherein the server subsystem comprises a processor coupled to memory, the processor configured to: process image data received from the camera system to determine whether a person is present in the image data; formulate a person detected notification in response to determining the person is present in the image data; transmit the person detected notification to a user device; and initiate, in response to receiving the person detection signal, an auto-secure operation including sending a close command to a movable barrier operator to cause the movable barrier operator to close a movable barrier associated with the movable barrier operator.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions, operations and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein that utilize data from a sensor of an access control system to control operations of the access control system and control access to a secured area such as a residence. The sensor may include, for example, one or more cameras configured to capture image data from a monitored area associated with the residence. The access control system may include, for example, one or more locksets of doors of the residence and/or one or more movable barrier operators of the residence. The systems, apparatuses and methods as described herein are utilized in conjunction with an auto-secure operation that enables the access control system to secure the residence against entry by an individual when a resident is not present, sleeping, or otherwise not available. In particular, the systems, apparatuses and methods as described herein enable the access control system to: detect an unexpected individual in proximity to a residence during a specific time period (e.g. 10 pm through 7 am), capture a record (e.g., still images and/or video with or without audio) of the unexpected individual entering the monitored area, and secure the residence against entry by the unexpected individual.

Figure 1:
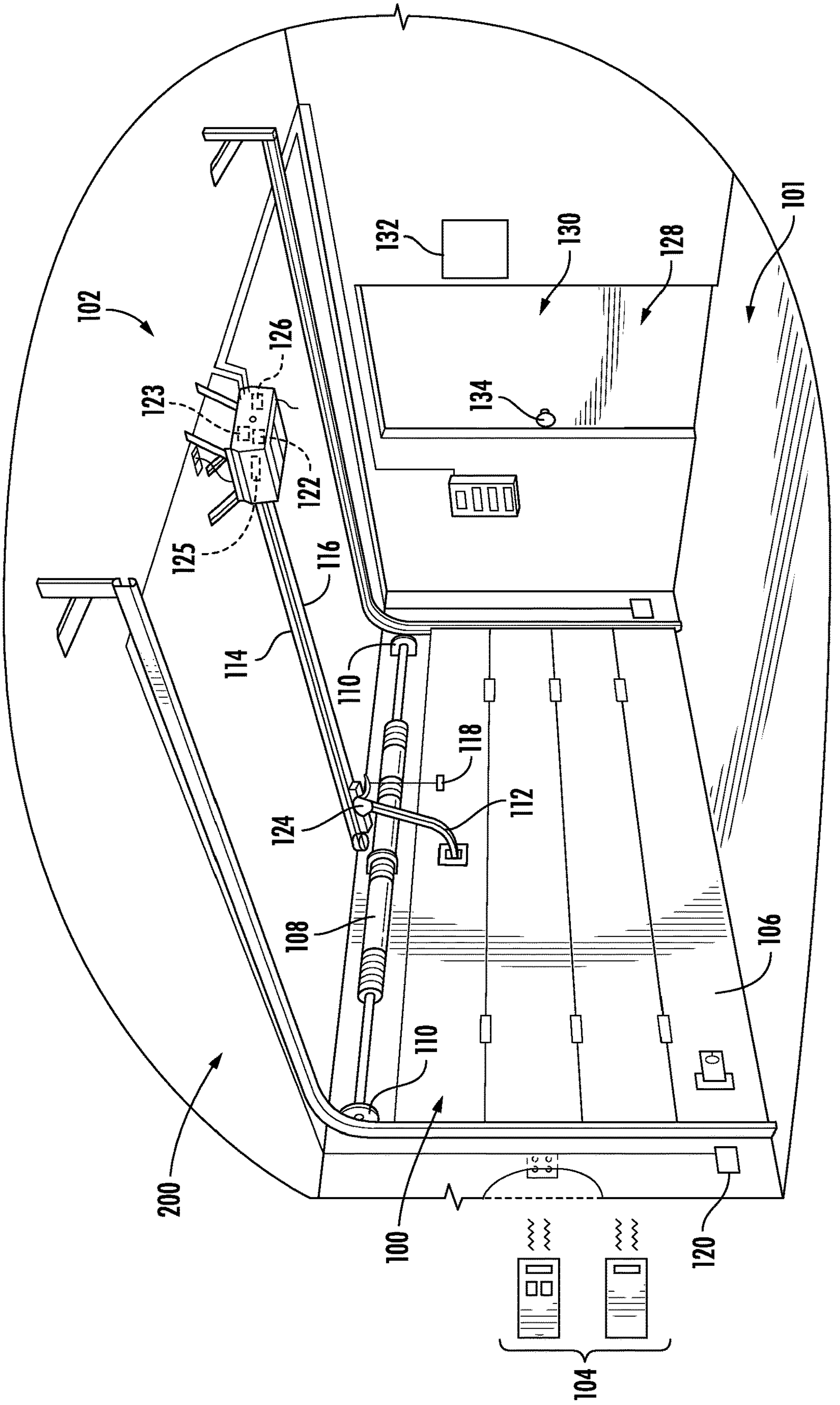
FIG. 1 is a view of an example movable barrier operator system for operating a garage door in accordance with example embodiments.

Referring now to FIG. 1, an access control system 200 is provided that includes a movable barrier operator system 100 for operating a movable barrier such as a garage door 106 that limits access to a secured area, such as a garage 101. In one embodiment, the movable barrier operator system 100 includes a movable barrier operator, such as a garage door operator 102, and one or more remote controls such as a transmitter 104. The one or more remote controls may also include, for example, a user device 204 (see FIG. 2) such as a smartphone, a laptop computer, a tablet computer, a wearable device, an in-vehicle device such as an infotainment system coupled to an in-vehicle transmitter, a keypad external to the garage 101, a wall control, a visor-mounted remote control, and/or a handheld transmitter such as a key fob. The garage door operator 102 includes an electric motor 122, communication circuitry 123, and a control circuit (including a processor 125 and a memory 126). The processor 125 may include, for example, a microprocessor, a system-on-a-chip, an application specific integrated circuit (ASIC), and/or a field programmable gate array (FPGA). The processor 125 can be one processor or a plurality of processors that are operatively connected. The memory 126 may include, for example, an electrical charge-based storage media such as EEPROM or RAM, or other non-transitory computer readable media such as an optical or magnetic-based storage device. The memory 126 can store information that can be accessed by the processor 125. For instance, the memory 126 (e.g., one or more non-transitory computer-readable storage mediums, memory devices) can include computer-readable instructions that can be executed by the processor 125. The instructions can be software, firmware, or both written in any suitable programming language or can be implemented in firmware or hardware. Additionally, or alternatively, the instructions can be executed in logically and/or virtually separate threads on processor 125. For example, the memory 126 can store instructions that when executed by the processor 125 cause the processor 125 to perform operations such as any of the operations and functions as described herein.

In some embodiments, the garage door operator 102 includes a rail 116 and drive member 114 such as a chain, belt, or screw driven by the motor 122 relative to the rail 116. The electric motor 122 in cooperation with the drive member 114 is operable to move the garage door 106 between open and closed positions. For example, a trolley 124 is coupled to the drive member 114 as well as an arm 112 that is attached to the garage door 106. The motor 122 shifts the trolley 124 back-and-forth along the rail 116 to lift and lower the garage door 106. A release mechanism 118 is coupled to the trolley 124 to allow the garage door 106 to be disconnected from the garage door operator 102 for manual operation such as during a power failure.

The movable barrier operator system 100 includes a drum and cable mechanism 110 that is attached to the garage door 106. The drum and cable mechanism 110 includes a drum and a corresponding cable on each side of the garage door 106. The cable is paid out from and wound up onto the drum when the garage door 106 is respectively lowered and raised. The drum and cable mechanism 110 couples to a counterbalance such as a torsion spring 108 that assists in lifting the weight of the garage door 106 and enables the garage door operator 102 to open or close the garage door 106 via movement of the trolley 124. In some embodiments, an optical device such as a photo eye system 120 senses an obstruction (e.g. object and/or a human) that may be in the path of the garage door 106 as the garage door 106 closes.

As seen in FIG. 1, the garage 101 can include an interior access door 128 disposed between an interior of the garage 101 and an interior of a home and selectively restricting access from the garage 101 into the interior of the home. The access control system 200 includes a smart lock such as a door lock system 130 configured to lock and unlock the interior access door 128 in response to receiving external command signals or identifying the presence or non-presence of various access conditions. The door lock system 130 can also be included in other doors of the residence besides the interior access door 128 such as egress/ingress front, back, side, etc. doors as well as bedroom, bathroom, and other doors inside of the home. The door lock system 130 may include a knob with a lock, a deadbolt, or a lockset in some embodiments.

With continued reference to FIG. 1, the access control system 200 may include a communication bridge or hub 132 in the secured area. The communication hub 132 may facilitate communication between the garage door operator 102, door lock system 130, and/or a remote resource such as a server computer. The communication hub 132 may facilitate opening and closing of the garage door 106 and locking and unlocking of the door lock system 130 based on various detected conditions. As with the door lock system 130, the access control system 200 may include other components not shown in FIG. 1, such as cameras proximate to the front, rear, side, etc. doors or at other exterior and/or interior locations of the residence.

Figure 2:
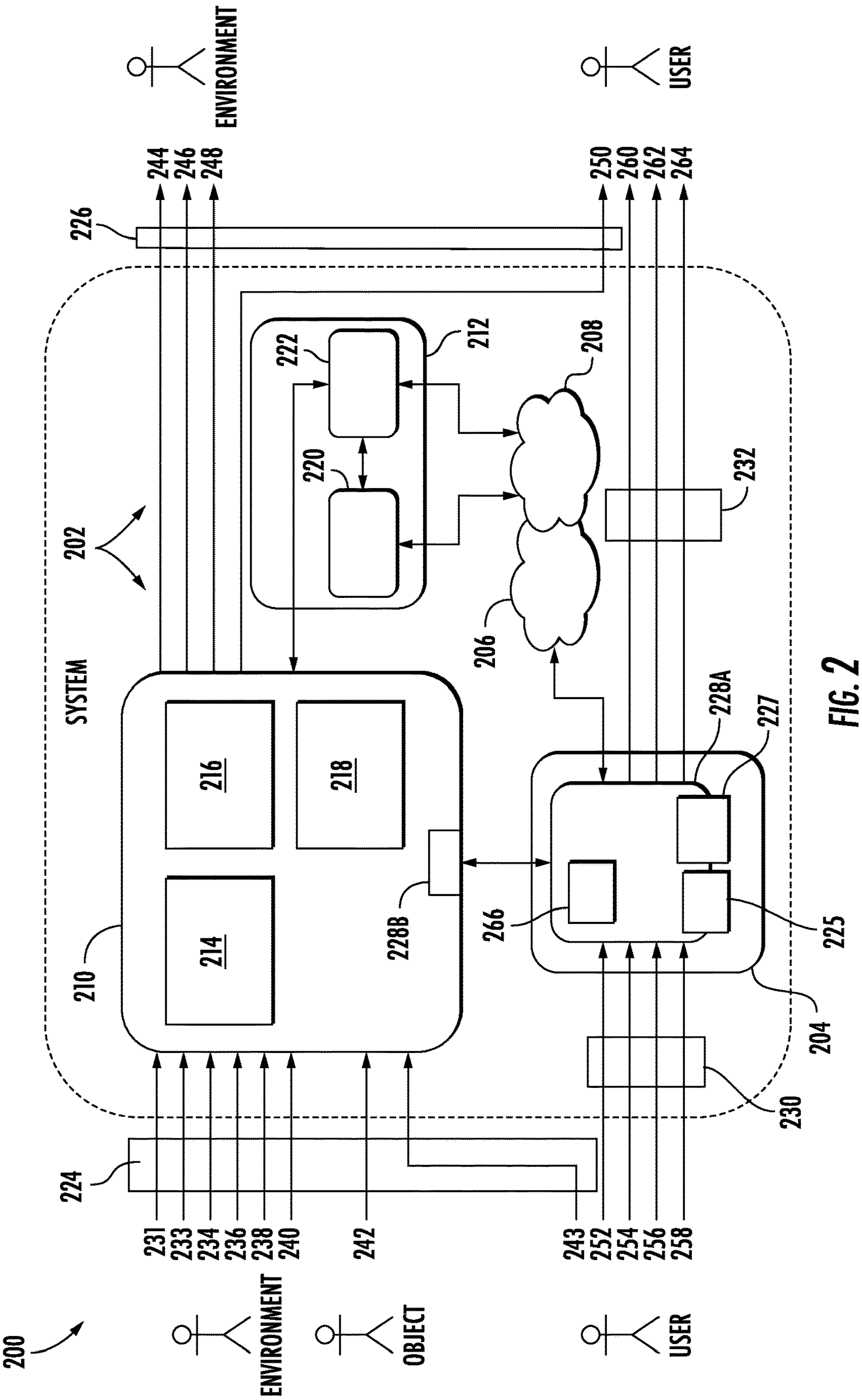
FIG. 2 is an example block diagram of an access control system for use in connection with the movable barrier operator system of FIG. 1 in accordance with example embodiments.

Turning now to FIG. 2, an example block diagram of the access control system 200 is provided. The access control system 200 includes a camera subsystem 202 and the user device 204 that communicates with a local area network 206 such a user's home wired or wireless network and a wide area network 208 such as the internet. The camera subsystem 202 includes a camera system 210 and a server subsystem 212.

The camera system 210 includes a processor 214, a memory 216, and a communication interface 218. The processor 214 may include, for example, a microprocessor, a system-on-a-chip, an application specific integrated circuit (ASIC), and/or a field programmable gate array (FPGA). The memory 216 may include, for example, an electrical charge-based storage media such as EEPROM or RAM, or other non-transitory computer readable media. The communication interface 218 can include various different wired and wireless systems such as WI-FI, Bluetooth, cellular radio, ethernet etc. for use in electrically communicating with other components of the access control system 200, the movable barrier operator system 100, and/or the door lock system 130. The server subsystem 212 can communicate with the camera system 210 via the communication interface 218 and can include an access control platform component 220 and an image data analysis component 222 that electrically communicate with each other and the wide area network 208, such as the internet. The access control platform component 220 and/or the video server component 222 can be located local to the camera system 210 or remote. When located remotely, the access control platform server component 220 and/or the video server component 222 can include server computers that are located away from the residence and that communicate with the camera system 210 via the wide area network 208. When located remotely, the access control platform component 220 and/or the image data analysis component 222 can also include hardware components that are located at the residence and that utilize the local area network 206 to communicate with the camera system 210 (e.g. via an access control system hub 201 depicted in FIG. 3). As seen in FIG. 2, the camera system 210 also receives camera system inputs a and produces camera system outputs 226.

The user device 204 includes a processor 225 and a memory 227. The processor 225 may include, for example, a microprocessor, a system-on-a-chip, an application specific integrated circuit (ASIC), and/or a field programmable gate array (FPGA). The memory 227 may include, for example, an electrical charge-based storage media such as EEPROM or RAM, or other non-transitory computer readable media. The memory 227 can include programed instructions that when executed by the processor 225 operates an application 228A that can interface with other system components, such as an application 228B that runs on the camera system 210. The user device 204 can receive user device inputs 230 and can provide user device outputs 232.

With reference to FIG. 2, the camera system inputs 224 can include an environment input 231, an alternating or direct current power input 233 used to power the camera system 210, a hardware mounting interface 234 for mounting the camera system 210 or portions thereof at one or more locations of the residence, ambient lighting input 236, a visual input 238, an audio input 240 such as a microphone, motion input 242, and a reset configuration user input 243. The environment input 231 can include a temperature sensor that triggers one or more components or the entirety of the camera system 210 to enter a cool-down/standby mode when the ambient temperature detected by the temperature sensor is above a threshold temperature that could cause the camera system 210 to overheat. The environment input 231 may also include a gyroscope or gravity sensor that detects an orientation of the camera system 210 so that image correction may be performed if the camera system 210 is installed upside down. The environment input 231 may also represent the place/location/context in which the camera system 210 is installed and constitute a confluence of factors that affect aspects of the operation of the camera system 210 such as field of view, power source, mounting height/angle/location, etc.

The motion input 242 can include a motion specific sensor such as a passive infrared sensor, millimeter wave radar motion sensor, lidar, or similar sensor that facilitates waking up of an image sensor, processor, etc. of the camera system 210 from a low (or off) power state when motion is detected by the motion specific sensor to determine that motion has been detected within a region of interest via the visual input 238. In embodiments in which the camera system 210 utilizes a wired power source (i.e. not solely battery powered), the camera system 210 may record substantially continuously such that motion detection to wake up the camera system 210 is optional. Furthermore, in general the camera system inputs 224 include any detectable condition used to activate the camera system 210. As described herein, these conditions include motion from a person detected using visual input 238, motion from a heat source (e.g., wild animal, person, etc.) detected using the motion input 242, an audio signal detected using the audio input 240 (e.g., breakage of a pane of glass or similar), changing exterior lighting conditions detected using the ambient lighting input 236, and weather conditions such as snow reflection, rain, etc.

The camera system outputs 226 can include a night vision output 244 such as an infrared light, a visible light output 246 such as a light emitting diode (LED) or other illumination source, a sound output 248 such as a speaker, and a status indicator 250 of the camera system 210. The status indicator 250 can include an indicator physically present on the camera system 210 such as an LED or a display. The status indicator 250 can also include audio information output from a speaker of the camera system 210.

The user device inputs 230 can include network provisioning information 252 for connecting the user device 204 and/or the camera system 210 to the local area network 206, a camera management user input 254 for controlling operations of the camera system 210, a subscription management user input 256 for connecting the user device 204 and/or the camera system 210 to an access control platform via the local area network 206 and the wide area network 208, and a push to talk user input 258. The push to talk user input 258 can include a button (e.g., a virtual button shown on a screen of the user device 204) and a microphone of the user device 204. When the push to talk mode is activated, the audio received by the microphone can be relayed from the user device 204 to the camera system 210 and then be provided as the push to talk output 248. As seen in FIG. 2, the user device outputs 232 can include a live stream output 260, a recorded video output 262, and a notification output 264 each of which can be provided via a user interface such as displayed on a display 266 (e.g., a touchscreen or an augmented reality display) of the user device 204. The live stream output 260 can include a live display of the visual input 238 and/or the audio inputs 240 to the camera system 210. The recorded video output 262 can include one or more time shifted displays of prior versions of the visual input 238 and/or the audio input 240.

Figure 3:
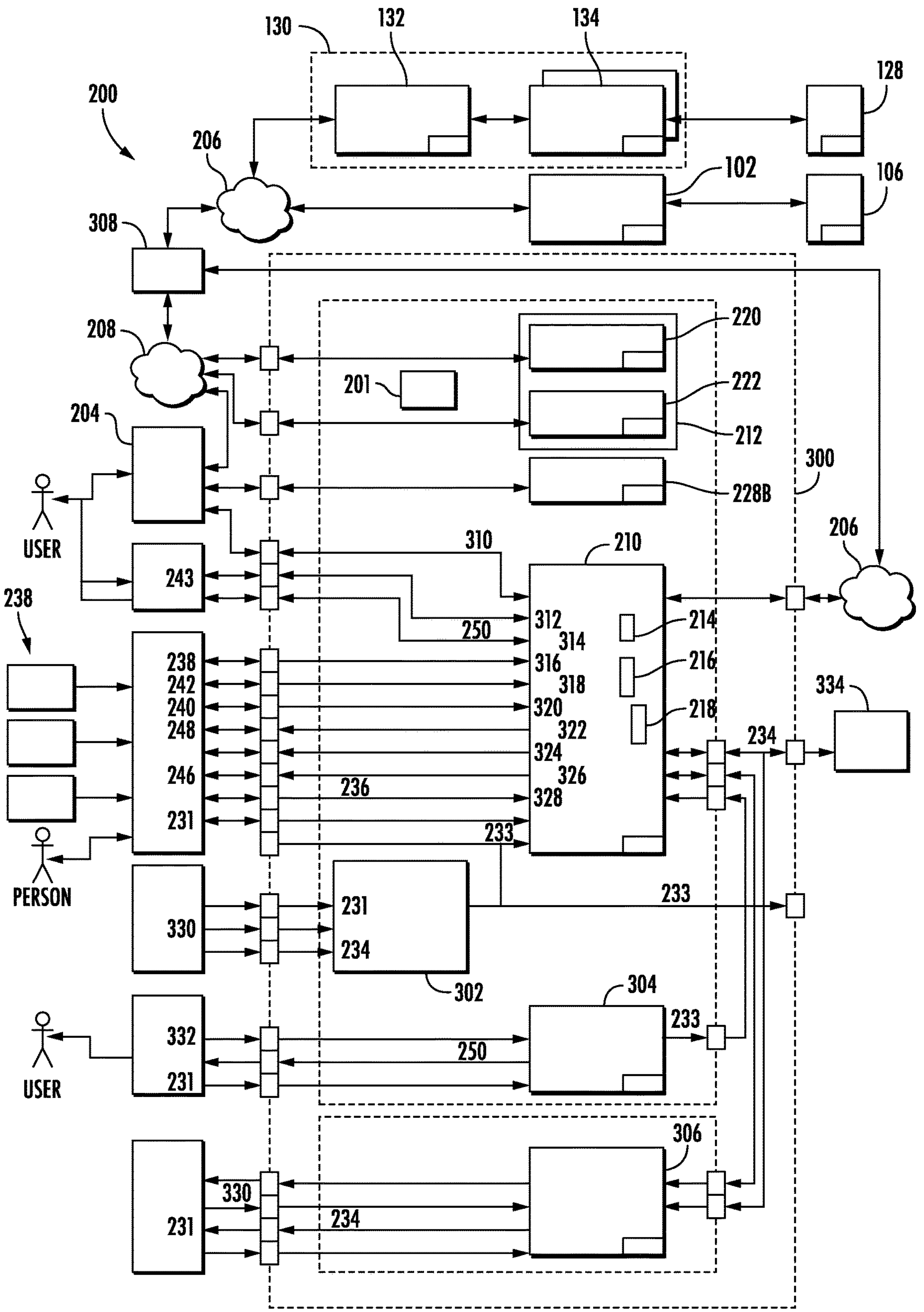
FIG. 3 is a view of another example block diagram of the access control system of FIG. 2.

Turning now to FIG. 3, another example block diagram of the access control system 200 is provided. As seen in FIG. 3, the camera subsystem 202 can be a part of a larger vision system 300 and can additionally include a power supply 302 and a rechargeable battery 304. The vision system 300 can also include a flood light 306 in addition to the camera subsystem 202. The flood light 306 is, when activated, configured to illuminate an area in proximity to the camera system 210 to scare away or otherwise deter a potential intruder and assist with capturing video or static images in darker ambient light conditions. Further, as seen in FIG. 3, the access control system 200 can include a router 308, modem, or access point that manages the local area network 206 and provides a connection to the wide area network 208. Further still, the door lock system 130 and the garage door operator 102 can communicate with the access control system 200 via the local area network 206. Further still, the door lock system 130 can include a communication hub 132 and one or more controllable locksets 134. For example, a home may be provided with one communication hub 132 and controllable lockets 134 for the front, rear, and side doors of the home. The communication hub 132 receives commands or other information from the local area network 206 and communicates with each of the controllable locksets 134 via wireless signals such as a Bluetooth connection. In some embodiments, the communication hub 132 is omitted and the controllable lockset 134 communicates directly with the local area network 206.

As seen in FIG. 3, the user device 204 can communicate directly with the camera system 210 via local, short-range, point-to-point communications such as a Bluetooth connection 310. The Bluetooth connection 310 can be facilitated in part by the communication interface 218 of the camera system 210. The camera system 210 additionally includes a reset button 312, at least one status LED 314, a lens and image sensor 316, a passive infrared sensor 318, a microphone 320, a speaker 322, at least one infrared light emitting diode 324, a spotlight 326, and an ambient light sensor 328.

In operation, the reset button 312 is activatable by the reset configuration user input 243, and when activated can reset the camera system 210 to a default or factory condition. The at least one status LED 314 can be configured to output the status indicator 250 to inform a user of a current operating status of the camera system 210. The lens and image sensor 316 are configured to capture image data, such as video and/or static images, of a field of view in a region proximate to the camera system 210. The camera system 210 can then store the captured image data to the memory 216 and/or the image data analysis component 222 of the server subsystem 212. The captured image data corresponds to the visual input 238, which as seen in FIG. 3 can include various elements such as a car license plate, an open or closed status of a gate, an open or closed status of a door (e.g. the garage door 106 or the interior access door 128), a person, etc. The passive infrared sensor 318 can receive the motion inputs 242. In some embodiments, the passive infrared sensor 318 can work in conjunction with the infrared light emitting diode 324 to detect motion in proximity of the camera system 210 based on changes in infrared radiation in proximity of the camera system 210. The spotlight 326 can be configured to output the visible light display 246 and in some embodiments can be configured to output light in a smaller area than the flood light 306 or when the flood light (which may be optional in some embodiments) is not active or included. The ambient light sensor 328 can be configured to measure the ambient lighting input 236. In response to the measurement of the ambient lighting input 236 by the ambient light sensor 328, the camera system 210 can modify settings of the lens and image sensor 316 to ensure that the image data captured by the camera system 210 are properly exposed to record events occurring in the field of view of the camera system 210.

As seen in FIG. 3, in some embodiments, the power input 233 to the camera system 210 can be a direct current power input. In such embodiments, the power supply 302 can include an alternating current to direct current converter that receives and then converts external alternating current 330 to the direct current input 233. The rechargeable battery 304 can also provide the direct current input 233 and, in some embodiments, can be charged via an external direct current input 332 and/or from the power supply 302. The flood light 306 can be powered from the external alternating current 330.

Further still, as seen in FIG. 3, the access control system 200 can include a housing 334 that accommodates the entire vision system 300 or at least the camera system 210, the power supply 302, the rechargeable battery 304, and the flood light 306. The housing 334 can integrate with the hardware mounting interface 234 to secure the larger vision system 300 in place. Examples of mounting locations for the housing 334 include a wall, sofit, electrical junction box, etc.

Figure 13:
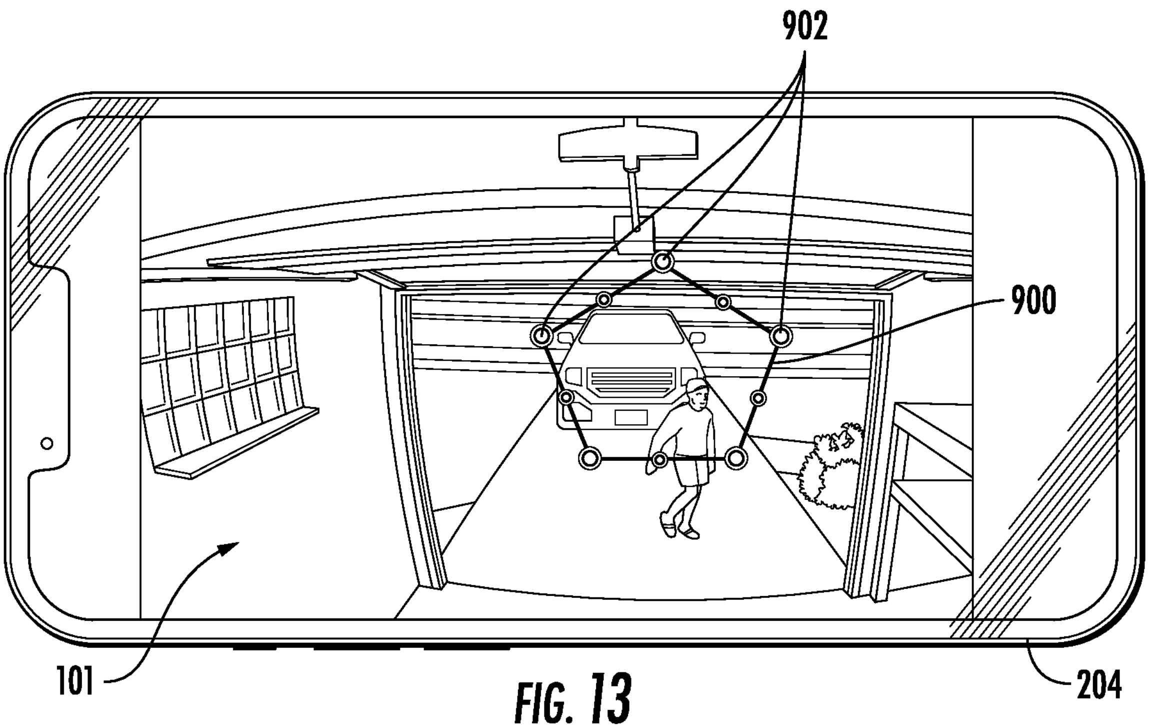
FIG. 13 is an example graphical user interface for setting up one or more regions of interest for the access control system of FIGS. 2 and 3 in accordance with example embodiments.
Figure 14:
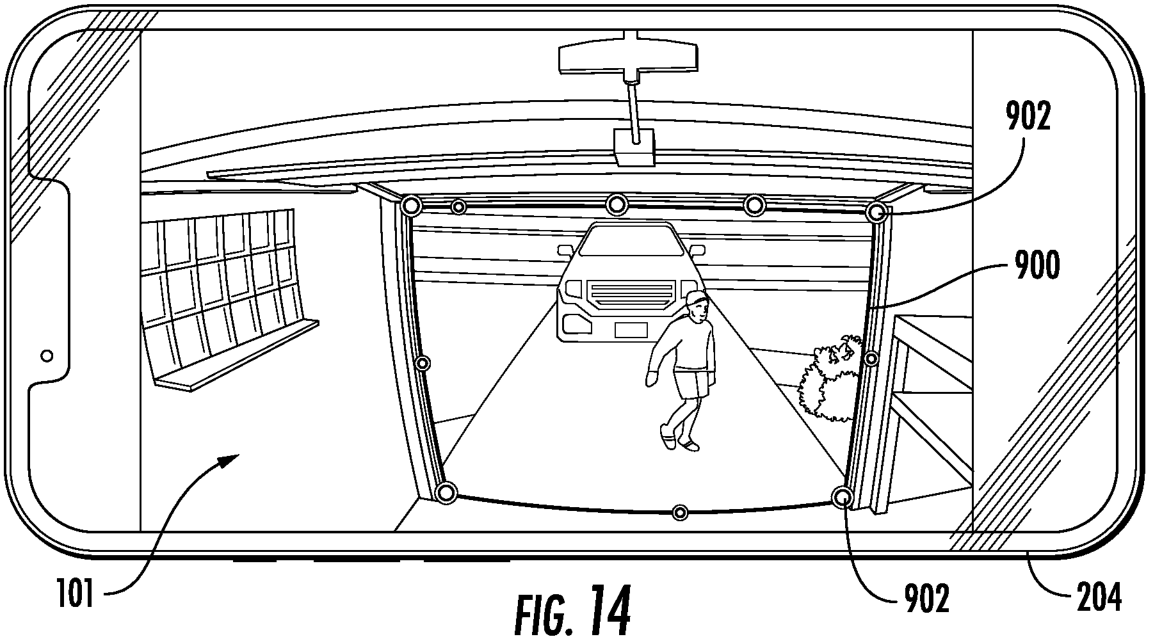
FIG. 14 is an example graphical user interface for setting up one or more regions of interest for the access control system of FIGS. 2 and 3 in accordance with example embodiments.
Figure 15:
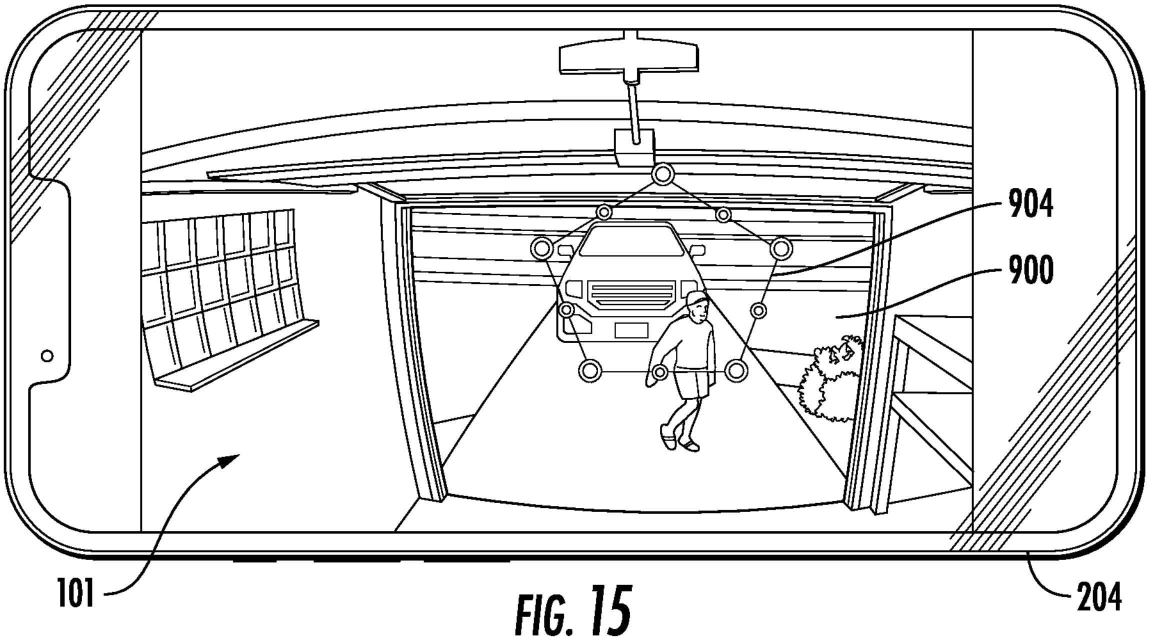
FIG. 15 is an example graphical user interface for setting up one or more regions of interest for the access control system of FIGS. 2 and 3 in accordance with example embodiments.
Figure 16:
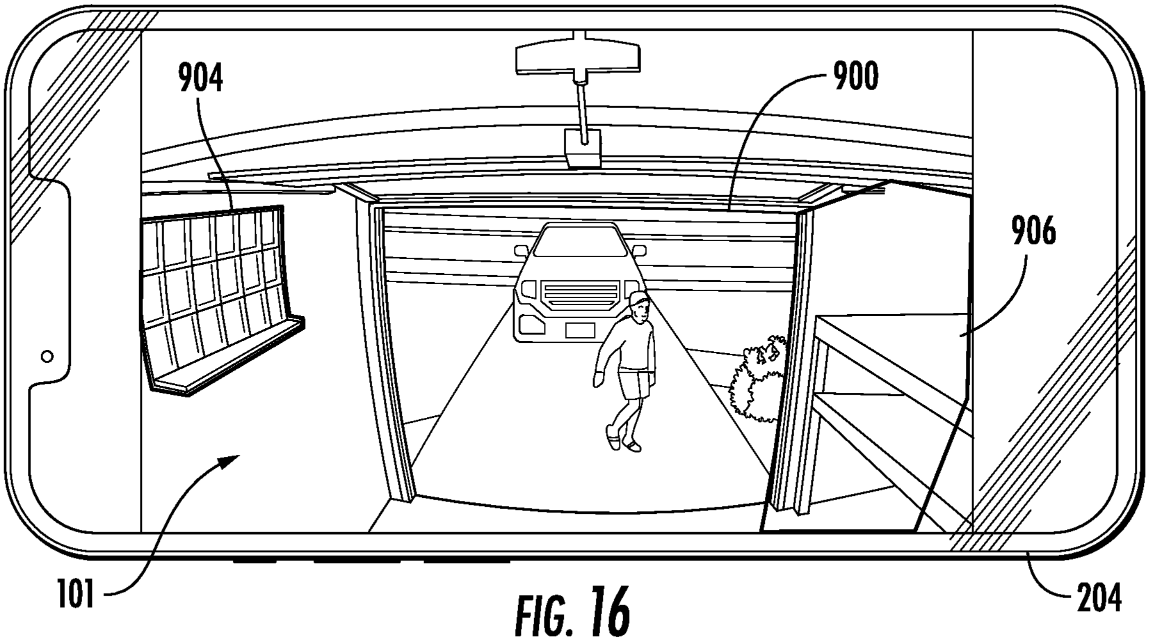
FIG. 16 is an example graphical user interface for setting up one or more regions of interest for the access control system of FIGS. 2 and 3 in accordance with example embodiments.

In general, the access control system 200 is programmed with an auto-secure operation to automatically close the garage door 106 and automatically lock the door lock system 130 when an unknown person is detected within a field of view of the camera system 210 or within some other predefined zone within the field of view. In some embodiments, a region of interest 900 (see FIG. 13) of the field of view of the camera system 210 can be set by a user or by a system component. For example, as shown in FIG. 13, the user device 204 can display an image captured using the camera system 210 of the garage 101 with an overlay of the region of interest 900 including a plurality of adjustable nodes 902 that can be dragged, traced via a stylus or human finger, or otherwise rearranged and/or otherwise moved to define a perimeter of the region of interest 900. In some embodiments, the perimeter of the region of interest 900 is initially a polygonal shape as shown in FIG. 13. As seen in FIG. 14, the initial polygon shape can be arranged to cover the entrance to the garage 101 by dragging the plurality of adjustable nodes 902. Furthermore, as shown in FIGS. 15 and 16, the access control system 200 can include additional regions of interest 904 and 906 that are arranged to cover different locations within the garage 101 such as a window area for the region of interest 904 and a storage area for the region of interest 906.

Furthermore, in some embodiments, the camera system 210 or other remote, network-based cloud components (e.g. server computer or middleware) connected to the camera system 210 can translate a user defined location of the altered nodes 902 into specific regions or pixel areas of the image sensor portion of the camera system 210. For movement detection or image analysis purposes discussed below, any region or pixel that contacts the user defined location of the altered nodes 902 will be considered as a part of the region of interest 900, 904, 906, etc. Data representative of the region of interests 900, 904, 906, etc. can be stored on the camera system 210 and/or in a remote computing resource such as the image data analysis component 222, access control platform component 220, or a middleware processing apparatus or cloud server computer.

In some cases, the access control system 200 can include multiple different camera systems 210. In these embodiments, a region of interest can be generated for each of the camera systems 210. The precision of these regions of interest 900, 904, 906, etc. may be higher than a human eye can detect. When motion is detected inside the regions of interest 900, 904, 906, etc., computer vision-based operations as described below are used to analyze images captured by the one or more camera systems 210, and then apply interpretations of the analyzed images to predictive or decision making tasks such as sounding an alarm, turning on the flood light 306, and/or securing one or more access points of the residence or area. In some embodiments, any action taken based on these decision-making tasks is saved (e.g. remotely in the cloud or locally in one or more premises-based component) for later review.

The auto-secure operation utilizes the lens and image sensor 316 along with image processing operations stored in the memory 216 and/or in the access control platform component 220 to capture and analyze image data. The image processing operations can include computer vision techniques such as object detection, object tracking, and image analysis, to recognize if an unknown person is detected in the field of view of the camera system 210. As used herein, an "unknown person" is an object within the field of view of the camera system 210 determined to be a person and not another object or creature but whose specific identity is not known or determined by the access control system 200. The access control system 200 may be configured to not specifically identify a person (e.g., to not employ a facial recognition technique or similar technique that determines whether a human is a particular human known as John Smith) in the field of view of the camera system 210, but rather determines the object is a person rather than a non-human animal, moving or stationary object, or vehicle as some examples.

In another embodiment, the access control system 200 may be configured to identify a person in the field of view of the camera system 210 as a known person such as using by recognizing the person's face or other biometric attribute, gait, clothing, or other indicia. The access control system 200 may therefore distinguish between an unknown person and a known person detected by the camera system 210. The access control system 200 may operate the auto-secure operation in response to the detected person being an unknown person but not operating the auto-secure operation in response to the detected person being a known person.

In some embodiments, the image processing operations can include a trained artificial intelligence program stored on the camera system 210 in the memory 216, at the access control platform component 220, or at some other location electrically accessible to the access control system 200. This trained artificial intelligence program can receive the images from the lens and image sensor 316 and identify when features present in the images correspond to the unknown person.

The auto-secure operation allows users to setup automatic rules to close the garage door 106 and lock the interior access door 128 or other door employing a door lock system 130. The access control system 200 may send alert notifications to one or more user devices associated with the residence based on the detection of the unknown person. The auto-secure operation proactively secures one or more access points of the residence while the alert notifications communicate the event to a person not present at the residence.

In some embodiments, the auto-secure operation is predicated on the detection of the unknown person in a region of interest in the field of view of one or more camera systems 210 during certain preconfigured or default time periods. For example, a user can setup the access control system 200 to have the auto-secure operation operable between 9 pm and 7 am while the user's family is asleep. Alternatively or additionally, the access control system 200 can be configured to automatically close and/or lock all open doors at a predetermined auto-lock time, such as 9 pm. In some embodiments, the preconfigured time period and/or the auto-lock time can be set by user input on the user device 204 via the application 228A.

As noted above, in some embodiments the access control system 200 determines that a person in the field of view of the camera system 210 is an unknown person without determining the identity of the person. In other words, the access control system 200 is operating the camera system 210 to detect a person in the field of view, whether the person is authorized or otherwise known to the access control system 200. In these embodiments, the access control system 200 may employ a time-out operation for the auto-secure operation to prevent locking out of a resident or a guest when the resident or guest leaves the residence for a short period of time but then returns, such as for collecting postal mail or a parcel from a mailbox or receptacle, or taking trash to a garbage can. The time-operation provides a set or adjustable time period for a person to be detected by the camera system 210 but without the access control system 200 initiating the auto-secure operation.

More specifically, the access control system 200 can activate the time-out operation when the access control system 200 detects a person entering the field of view of the camera system 210 from the inside of the home, that is, the time-out operation being active for a person who is known/trusted (e.g. a resident/occupant) and not an unknown person such that the resident does not become locked out unintentionally. In embodiments where the auto-secure operation is limited to a preconfigured time period, e.g., 9 pm-7 am, the time-out operation can be utilized during the preconfigured time period. Furthermore, the access control system 200 can utilize geofencing, knowledge of a door being opened from the interior of the residence (i.e. indicative of high probability that the individual opening the door is a known/trusted person and not an unknown person), and/or the garage door operator 102 being actuated from an interior keypad to identify that a person in the field of view of the camera system 210 entered the field of view from inside the home. For example, if a resident wants to take out the garbage, the resident can open the garage door 106 using a wall control in the garage 101 and the access control system 200 will determine that the garage door 106 was opened from inside the residence. The access control system 200 then triggers the time-out operation to inhibit operation of the auto-secure operation and associated closing of the garage door 106 while the resident is outside of their home. In some embodiments, the time-out operation can disable the auto-secure operation for a short period of time (e.g. approximately 5-15 minutes). However, in some embodiments, the time-out operation can disable the auto-secure operation until another triggering event is detected such as the garage door 106 being closed or a door equipped with the door lock system 130 being closed.

In an example operation, the camera system 210 detects movement of an object in the region of interest of the field of view of the camera system 210 either using the passive infrared sensor 318 and/or the lens and image sensor 316. This movement triggers the access control system 200 to reconfigure from a monitoring mode to an attempted access mode and begin a recording event whereby the lens and image sensor 316 captures images and communicates associated image data to the image data analysis component 222. The access control system 200 determines whether the object is an unknown person by processing the image data locally at the camera system 210, at the image data analysis component 222, at the access control platform component 220, or various combinations thereof. The image data analysis component 222 or the camera system 210 then informs the access control platform component 220 if an unknown person has been detected. Then, if notification features have been enabled, such as by using the client application 228A, the access control platform component 220 sends a notification of the recording event to the user device 204. Additionally, in some embodiments, the detection of movement can initiate broadcast of other alerts such a chime or warning sound from the speaker 322, turning on of the flood light 306, out-dialing a phone call to play a prerecorded message for a security company and/or emergency service provider (e.g. police, 911 call center or other public safety answering point 'PSAP'), etc. In some embodiments, the other alerts can also include automated messages played from a loudspeaker of the access control system 200 that notifies the unknown person they have been detected and that the home has been secured when the access control system 200 detects the unknown person.

In response to the camera system 210 detecting movement, the camera system 210 utilizes image processing operations to determine whether the movement was caused by an unknown person or some other object such as a vehicle, landscaping element, or non-human animal. When the camera system 210 determines that an unknown person is present, the camera system 210 informs the image data analysis component 222 likewise and provides an image of the unknown person to the image data analysis component 222. The image data analysis component 222 informs the access control platform component 220 that the unknown person was detected and provides the image from the camera system 210 to the access control platform component 220. In some embodiments, the camera system 210 can communicate this information directly to the access control platform component 220 without utilizing the image data analysis component 222. The access control platform component 220 may send a notification regarding the detection of the unknown person to the user device 204.

When an unknown person is detected and the auto-secure operation is enabled (e.g., during a preconfigured time period), the access control system 200 can trigger the door lock system 130 to lock the interior access door 128 or another door to which the door lock system 130 is coupled or otherwise in communication when the door lock system 130 is in an unlocked state. Similarly, detection of the unknown person under these conditions can cause the access control system 200 to trigger the garage door operator 102 to automatically close the garage door 106 when the garage door 106 is open. If notifications are enabled, notifications of the garage closing and/or door locking events can be sent to the user device 204. If the door lock system 130 is locked or the garage door 106 is closed, the door lock system 130 remains locked and the garage door operator 102 keeps the garage door 106 closed upon detection of the unknown person.

In general, when the notifications are disabled, the access control platform component 220 will refrain from sending any notifications to the user device 204. Further, when the user device 204 operating the client application 228A is not instantiated/running or is not connected to the local area network 206 and/or the wide area network 208, the client application 228A will not receive any notifications until a network connection is reestablished. Similarly, when device settings of the user device 204 trigger a notification delay, the client application 228A will delay presenting any notifications on the display 266 in accordance with the device settings.

Figure 4:
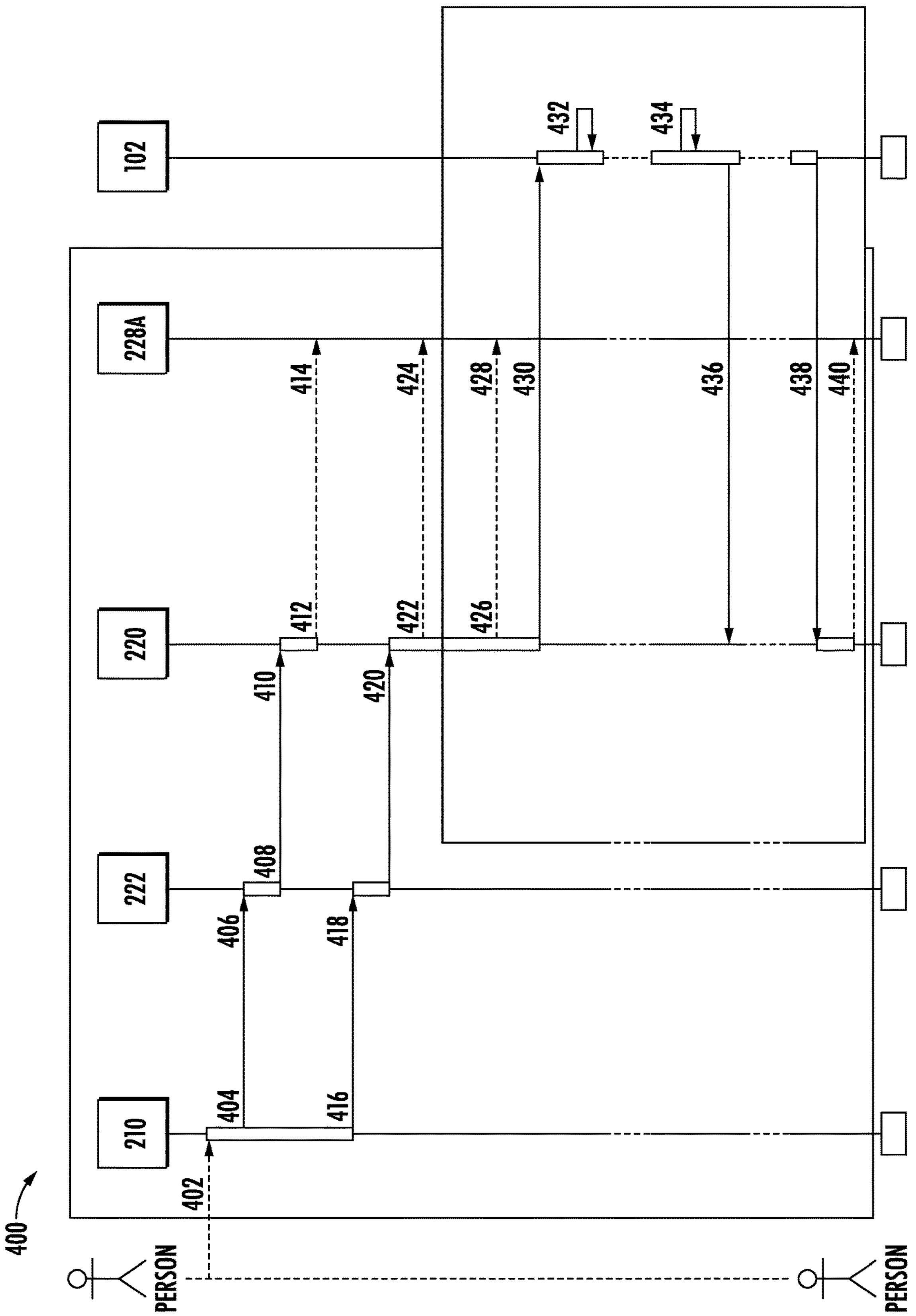
FIG. 4 is a flow diagram showing an example operating method of the access control system of FIGS. 2 and 3 in accordance with example embodiments.

Turning now to FIGS. 4-8, example methods of operating the access control system 200 are shown. First, a method 400 is shown in FIG. 4 that includes an auto-secure operation for the garage door 106. Although FIG. 4 depicts steps performed in a particular order for purposes of illustration and discussion, the method discussed herein may not be limited to any particular order or arrangement in accordance with non-illustrated embodiments. One skilled in the art, using the disclosure provided herein, will appreciate that various steps of the method disclosed herein can be omitted, rearranged, combined, and/or adapted in various ways without deviating from the scope of the present disclosure.

The method 400 includes the camera system 210 detecting 402 a person approaching the camera system 210. The detecting 402 can be accomplished by the lens and image sensor 316 and/or the passive infrared sensor 318 as discussed previously. After the detecting 402, the method 400 includes initiating 404, e.g., capturing, a video recording of the person via the lens and image sensor 316 and sending 406 the recording, e.g., the captured recording, to the image data analysis component 222. Upon the image data analysis component 222 receiving the video data, the method 400 includes the image data analysis component 222 formulating or assembling 408 a motion detected event signal and sending 410 the motion detected event signal to the access control platform component 220. Upon receipt of the motion detected event signal by the access control platform component 220, the method 400 includes the access control platform component 220 formulating or assembling 412 a motion detected notification and sending 414 the motion detected notification to the client application 228A for presentation to a user e.g. via the display 266 of the user device 204.

Furthermore, after the detecting 402, the method 400 includes processing 416 of the initiated video recording to determine whether the unknown person is present in the video recording. In an embodiment, the processing 416 can be performed fully at the camera system 210 as seen in FIG. 4. In other embodiments, some or all of the processing 416 can be performed at the image data analysis component 222 and/or the access control platform component 220. As seen in FIG. 4, when the processing 416 is performed at the camera system 210 and indicates that an unknown person is present in the video recording, the method 400 includes sending 418 a person detection signal to the image data analysis component 222. The person detection signal can include an image of the unknown person extracted from the video recording or separately captured using the lens and image sensor 316. When the person detection signal is received by the image data analysis component 222, the method 400 includes the image data analysis component 222 sending 420 the person detection signal to the access control platform component 220. In some embodiments, the camera system 210 can bypass the image data analysis component 222 and transmit the person detection signal directly to the access control platform component 220.

When the access control platform component 220 receives the person detection signal, the method 400 includes formulating or assembling 422 a person detected notification and sending 424 the person detected notification to the client application 228A for presentation to the user via the display 266 of the user device 204. Furthermore, the method 400 includes initiating the auto-secure operation of the method 400 for the garage door 106 upon receipt of the person detection signal.

As seen in FIG. 4, the auto-secure operation of the method 400 includes the access control platform component 220 formulating or assembling 426 an auto-secure event notification and sending 428 the auto-secure event notification to the client application 228A for presentation to the user via the display 266 of the user device 204. Furthermore, the auto-secure operation of the method 400 includes the access control platform component 220 sending 430 a close command to the garage door operator 102. Upon receiving the close command, the garage door operator 102 initiates 432 an unattended close operation, whereby the garage door operator 102 flashes a light and emits a sound for a period of time such as eight seconds, before the garage door operator 102 begins closing 434 the door 106. The method 400 includes the garage door operator 102 sending 436 a door closing state indicator to the access control platform component 220. Then, after approximately twelve seconds, the door 106 reaches the closed position and the garage door operator 102 sends 438 a door is closed state indicator to the access control platform component 220. The method 400 further includes the access control platform component 220 sending 440 a garage door closed notification to the client application 228A for presentation to the user via the display 266 of the user device 204.

Some exceptions to the auto-secure operation of the method 400 can occur that will result in the garage door 106 remaining open. These exceptions include situations where the garage door operator 102 is not electrically connected to the access control platform component 220 such that the close command cannot be sent to the garage door operator 102 and situations where entrapment protection for the garage door 106 is triggered (e.g. the photo eye system 120 indicates an object is in the path of the garage door 106) so as to cause the closing garage door 106 to reverse back to the open position.

Figure 5:
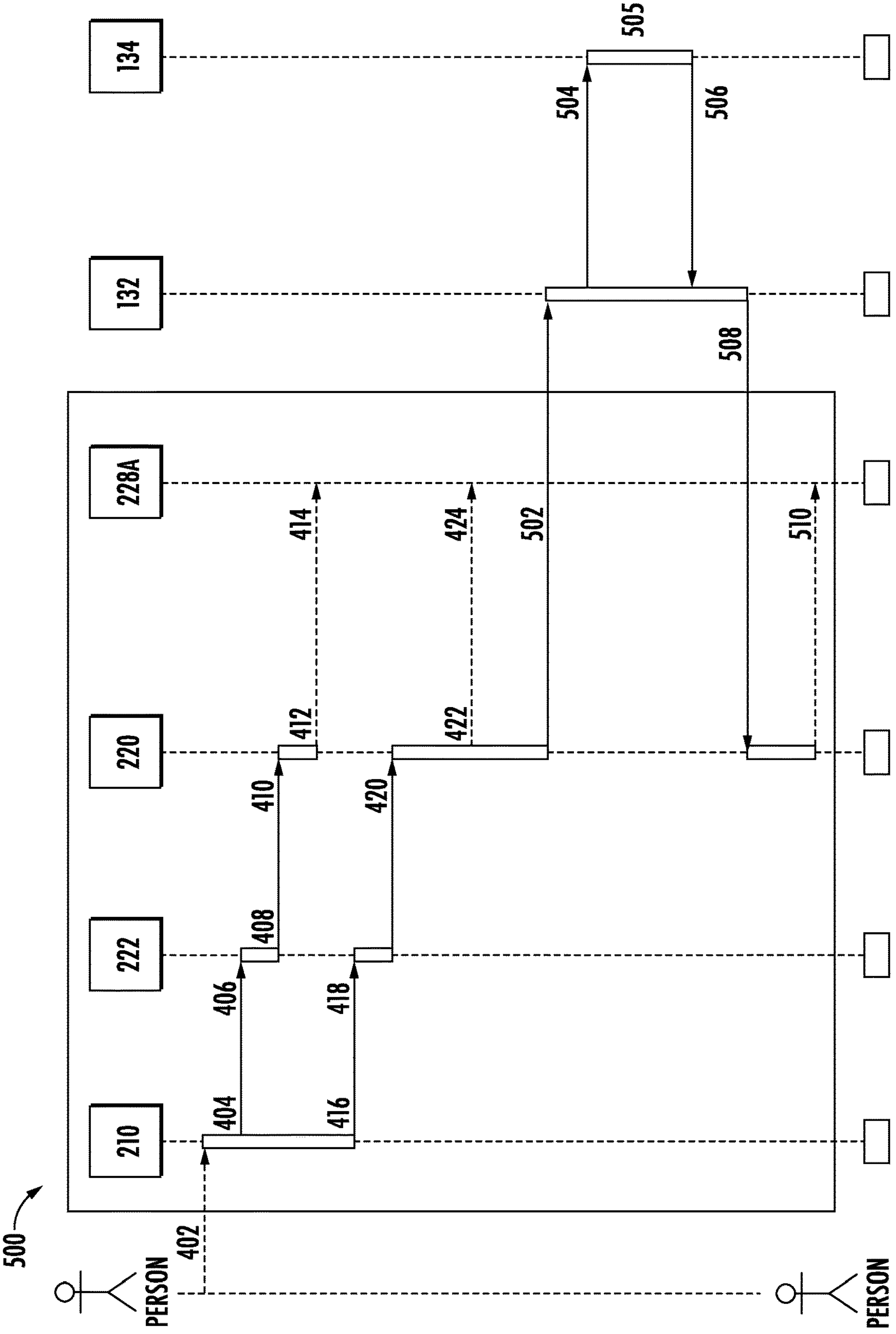
FIG. 5 is a flow diagram showing an example operating method of the access control system of FIGS. 2 and 3 in accordance with example embodiments.

Turning now to FIG. 5, a method 500 for the door lock system 130 is shown. The method 500 includes steps 402-424 of the method 400. However, following the sending 424 of the notification to the client application 228A, the method 500 includes a different auto-secure operation beginning with sending 502 a lock command to the communication hub 132 or directly to the controllable lockset 134 in embodiments where the communication hub 132 is omitted. When the communication hub 132 receives the lock command, the method 500 includes the communication hub 132 sending 504 the lock command to the controllable lockset 134 via a Bluetooth communication. Upon receiving the lock command, the method 500 includes the controllable lockset 134 locking 505 the interior access door 128 or other door to which the door lock system 130 is associated and sending 506 a door locked state indicator to the communication hub 132 via a Bluetooth communication. When the communication hub 132 receives the door locked state indicator, the method 500 includes the communication hub 132 sending 508 the door locked state indicator to the access control platform component 220. In response to the access control platform component 220 receiving the door locked state indicator, the access control platform component 220 sends 510 a door locked notification to the client application 228A for communication to the user via the display 266 of the user device 204.

Some exceptions to the auto-secure operation of the method 500 can occur that will result in the integrated smart door lock system 130 remaining unlocked. These exceptions include situations where the communication hub 132 is not connected to the access control platform component 220 or the communication hub 132 is not connected to the controllable lockset 134 such that the close command cannot be received by the controllable lockset 134. Additional exceptions include situations where the controllable lockset 134 is misaligned with the associated strike plate, such as if the door 128 is open.

Figure 6:
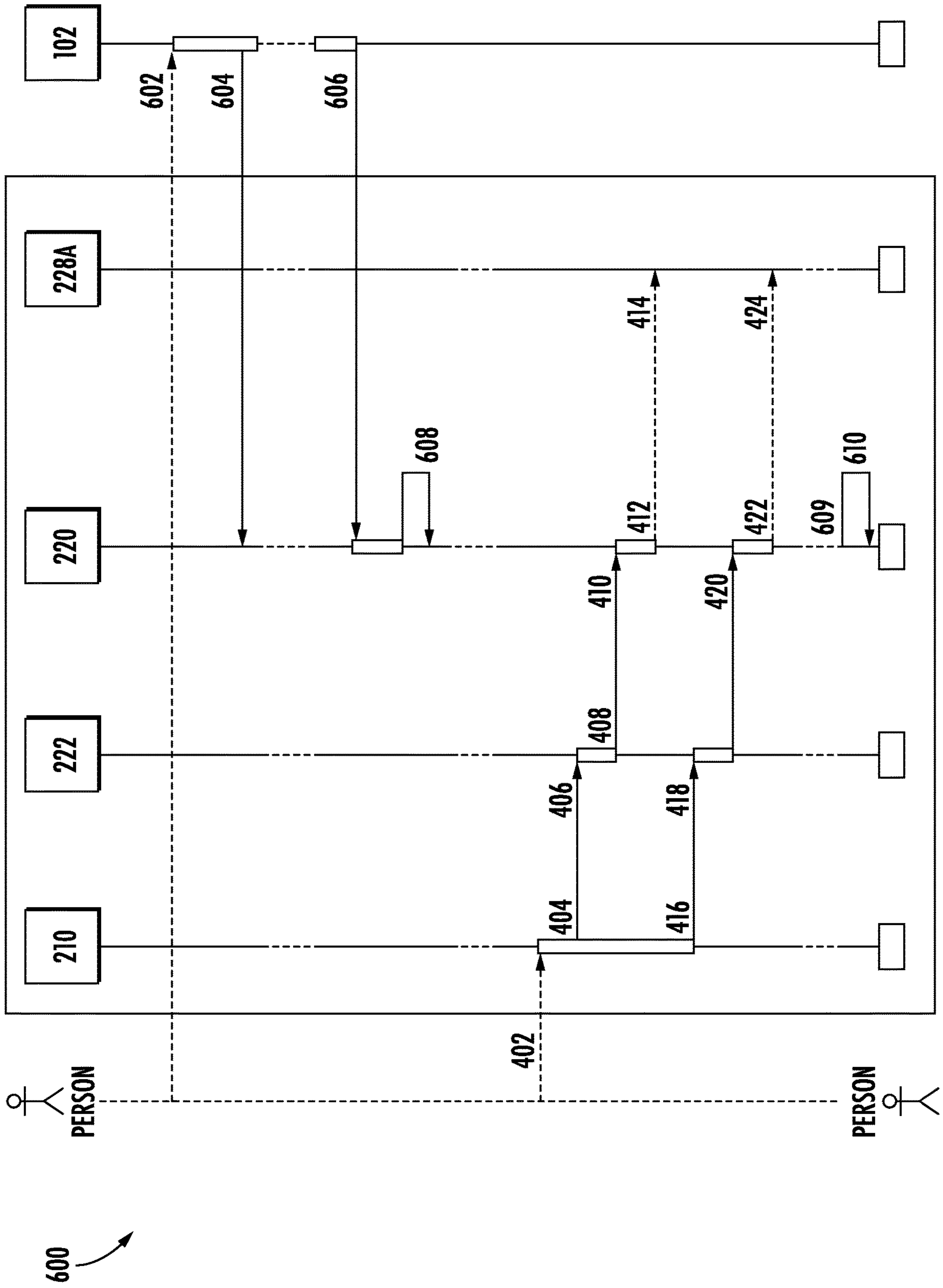
FIG. 6 is a flow diagram showing an example operating method of the access control system of FIGS. 2 and 3 in accordance with example embodiments.

Turning now to FIG. 6, a method 600 for the garage door 106 is shown that includes an auto-secure time-out operation. The method 600 includes the steps 402-424 of the method 400 as described above, except that at when the person detection signal is received by the access control platform component 220, the auto secure feature has been temporarily disabled as a result of a controlled opening of the garage door 106.

More specifically, the method 600 can include, prior to the step of detecting motion 402, the garage door operator 102 receiving 602 a garage open command. The garage open command can be initiated in a variety of ways such as a radio frequency remote control, an in-vehicle transmitter, a wall control of the garage door operator 102, the client application 228A running on the user device 204, a third-party application in communication with the access control platform, etc. Once the open command is received, the method 600 includes the garage door operator 102 beginning to open the garage door 106 and the garage door operator 102 sending 604 a door opening state indicator to the access control platform component 220. Then, after approximately 12 seconds, the garage door 106 has reached the open position and the garage door operator 102 sends 606 a door open state indicator to the access control platform component 220. Upon the access control platform component 220 receiving the door open state indicator, the access control platform component 220 disables 608 the auto secure-operation for a predetermined time period. In some embodiments, the predetermined time period is measured by an auto-secure disable timer. Further, in some embodiments, the access control platform component 220 can disable the auto-secure operation upon receiving the door opening state indicator. Then, while the auto-secure disable timer is active and the auto-secure operation is disabled, the method 600 can include the steps 402-424. Following the sending 424, the method 600 can include the access control platform component 220 identifying 609 that the auto-secure disable timer has expired and, responsive thereto, re-enabling 610 the auto secure-feature.

Figure 7:
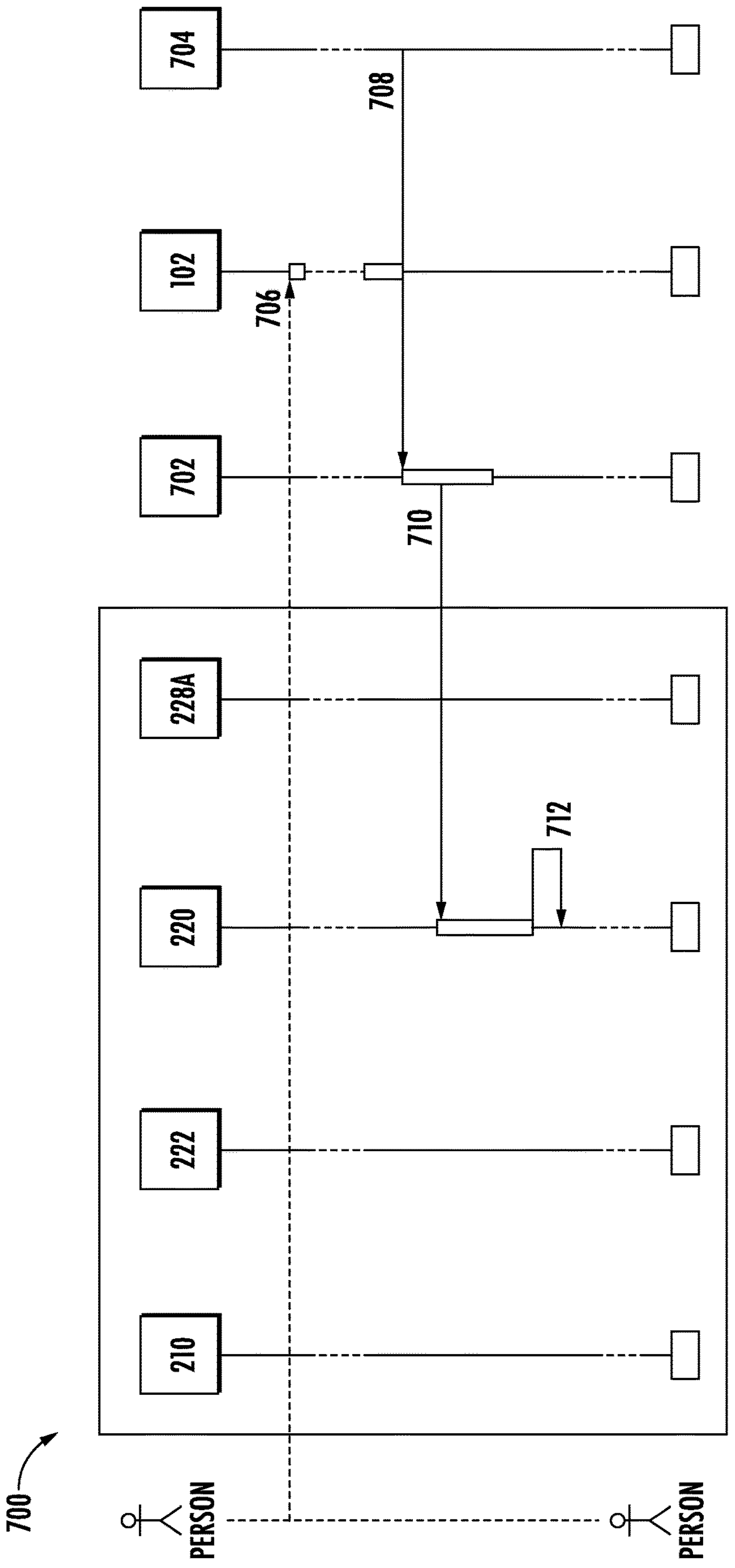
FIG. 7 is a flow diagram showing an example operating method of the access control system of FIGS. 2 and 3 in accordance with example embodiments.

Turning now to FIG. 7, a method 700 for disabling the auto secure operation is provided that is different than the approach of method 600 discussed above. In particular, the method 700 can be utilized where the garage door operator 102 is not directly connected to the access control platform component 220 over the local area network 206 and/or wide area network 208 and instead utilizes a communication hub 702 and a door position sensor 704 to detect the position and/or direction of movement of the garage door 106. For example, the communication hub 702 may be configured to communicate with the access control platform component 220 via the local area network and/or wide area network 208. The communication hub 702 transmits wired or wireless command signals to the garage door operator 102, such as radio frequency signals in the 300 MHz-400 MHz range. The communication hub 702 receives data from the door position sensor 704 via a radio frequency signal. The door position sensor 704 may include, for example, an accelerometer, a gyroscope, and/or a tilt switch.

As seen in FIG. 7, the method 700 includes the garage door operator 102 receiving 706 a garage open command. As in the method 600, the garage open command can be initiated in a variety of ways such as a radio frequency remote control, an in-vehicle transmitter, a wall control of the garage door operator 102, the client application 228A running on the user device 204, a third-party application, etc. Once the garage open command is received, the method 700 includes the garage door operator 102 opening the garage door 106 and door sensor 704 monitoring the position, orientation, and/or direction of movement of the garage door 106. When the door sensor 704 senses that the garage door 106 is open, the auto-secure time-out method 700 includes the door sensor 704 sending 708 a door is open state indicator to the access control platform component 220. Upon receiving the door is open state indicator, the method 700 includes the access control platform component 220 disabling 712 the auto-secure operation for a predetermined time period. The method 700 then continues as in the method 600 by re-enabling the auto secure operation after the auto-secure disable timer has expired.

Figure 8:
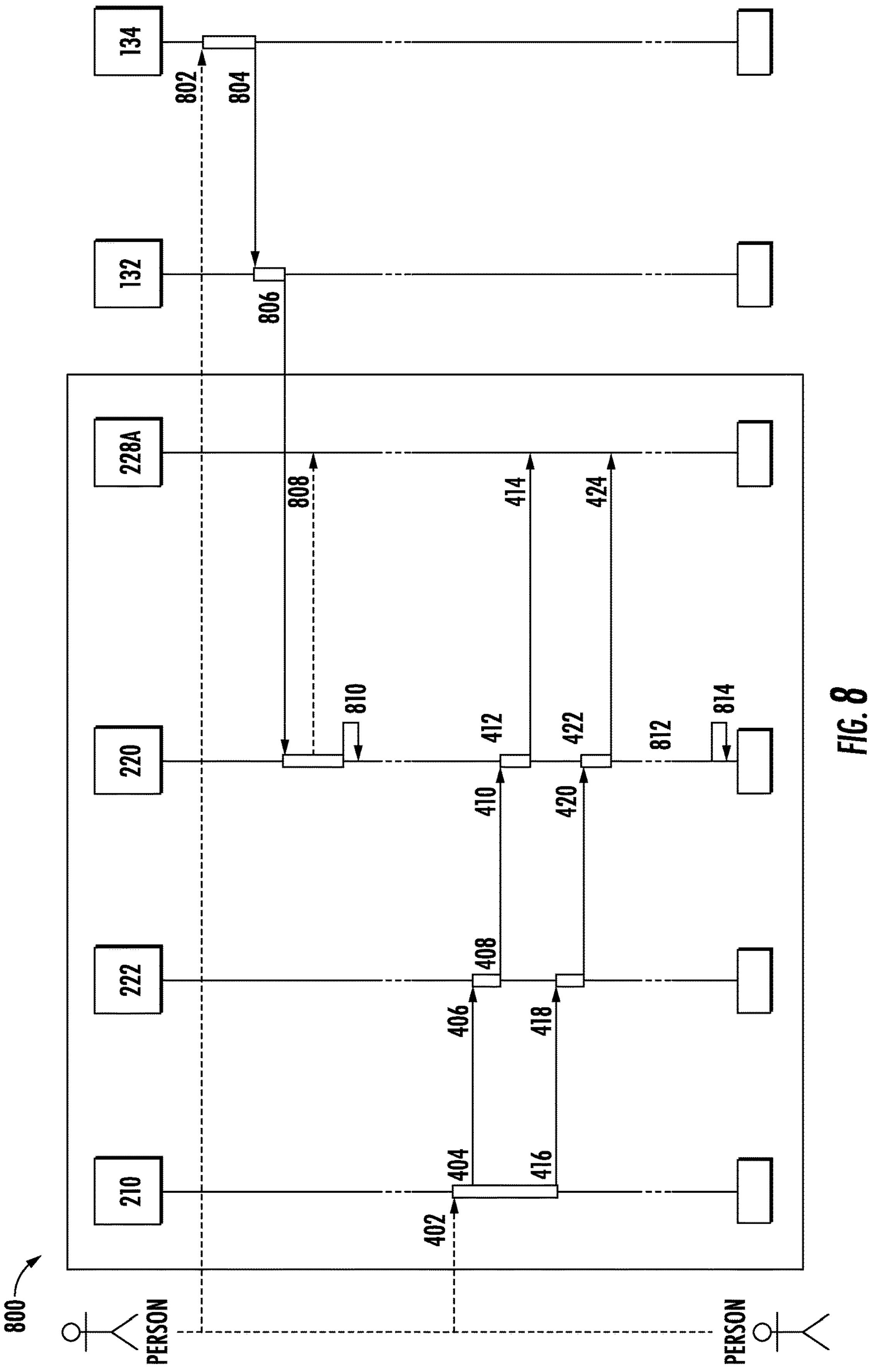
FIG. 8 is a flow diagram showing an example operating method of the access control system of FIGS. 2 and 3 in accordance with example embodiments.

Turning now to FIG. 8, a method 800 for the interior access door 128 or other door(s) that include the door lock system 130 is shown. The auto-secure time-out method 800 includes the steps 402-424 of method 400 described above, except that when the person detection signal is received by the access control platform component 220, the auto secure feature has been temporarily disabled as a result of a controlled unlocking of the interior access door 128 or other door(s) that includes the door lock system 130.

In particular, the method 800 can include, prior to the detecting of motion 402, the controllable lockset 134 receiving 802 a door unlock command. The door unlock command can be initiated in a variety of ways such as a radio frequency remote control, an in-vehicle transmitter, a code entered on a keypad of the controllable lockset 134, the client application 228A, etc. Additionally, in embodiments where the controllable lockset 134 can be manually operated (e.g. by user input turning a knob or deadbolt), the manual operation of the controllable lockset 134 can be equivalent to receiving the door unlock command for purposes of the method 800. Once the controllable lockset 134 receives 802 the door unlock command or the controllable lockset 134 is manually opened or unlocked, the method 800 includes the controllable lockset 134 sending 804 a door unlocked state indicator to the communication hub 132. Additionally, where the controllable lockset 134 is not manually opened or unlocked, the auto-secure time-out method 800 can include automatically opening or unlocking the controllable lockset 134 in response to the door unlock command. Then, the method 800 includes the communication hub 132 sending 806 the door unlocked state indicator to the access control platform component 220. Upon the access control platform component 220 receiving the door unlocked state indicator, the access control platform component 220 sends a door unlocked notification to the client application 228A and disables 810 the auto-secure operation for a predetermined time period which may be set by a user. As with the method 600, in some embodiments, the predetermined time period is measured by the auto-secure disable timer. Then, while the auto-secure disable timer is active and the auto-secure operation is disabled, the method 800 can include the steps 402-424. Following the sending 424, the method 800 can include the access control platform component 220 identifying 812 that the auto-secure disable timer has expired and, responsive thereto, re-enabling 814 the auto-secure operation.

Figure 9:
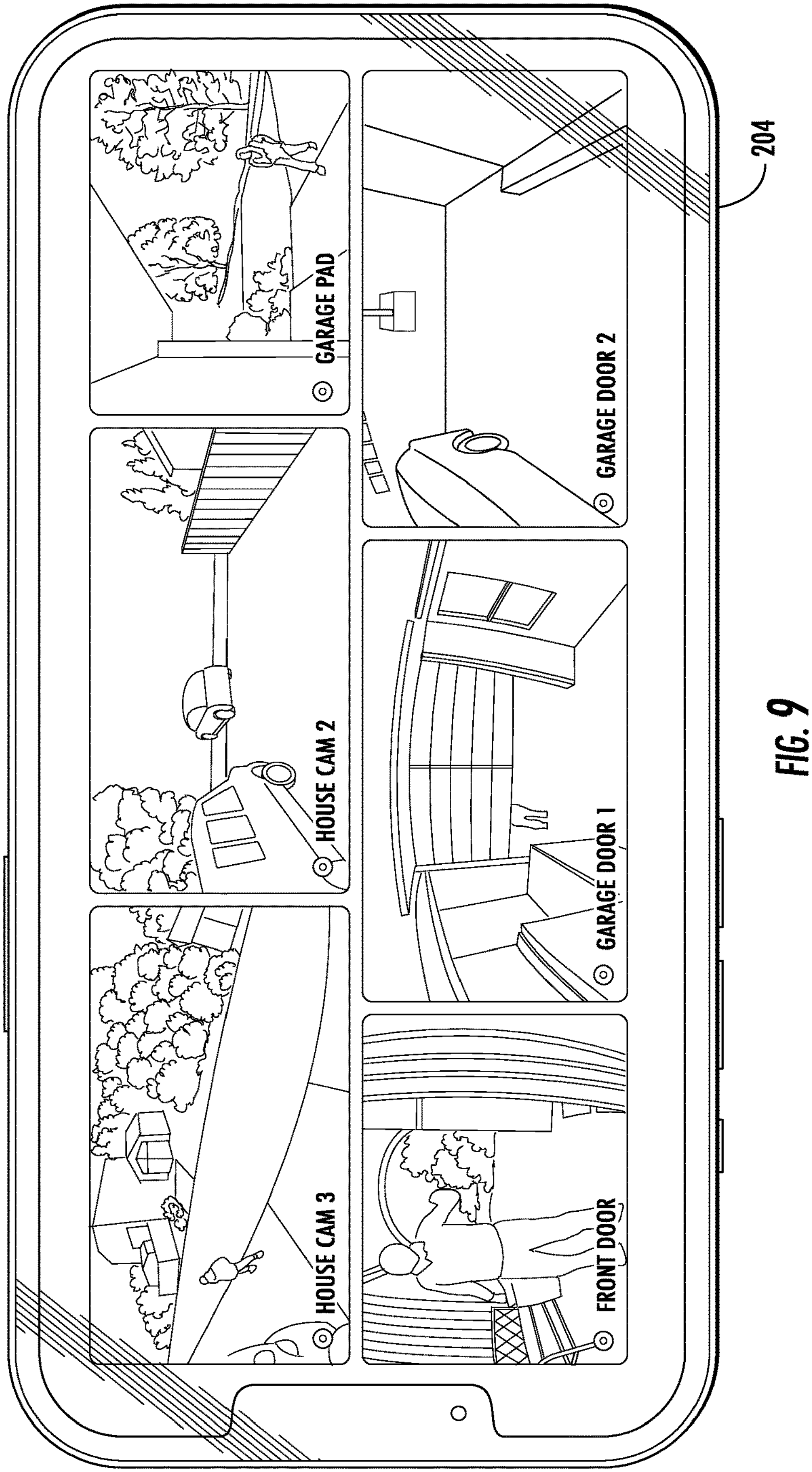
FIG. 9 is an example graphical user interfaces of a user device for controlling various aspects of the access control system of FIGS. 2 and 3 in accordance with example embodiments.

Turning now to FIGS. 9-12, views of a graphical user interface displayed on the display 266 of the user device 204 are shown. First, FIG. 9 shows a composite live or recorded view of the visual input 238 for multiple camera systems 210. The composite live view includes views from multiple camera systems 210 that captured the unknown person entering the region of interest of one or more of the camera systems 210. In some embodiments, the composite live view is triggered by a first camera system that detects a person or similar security event and then activating one or more secondary camera systems that are linked to the first camera system to begin recording as a result of the same person detection or security event so as to get additional vantage points.

Figure 10:
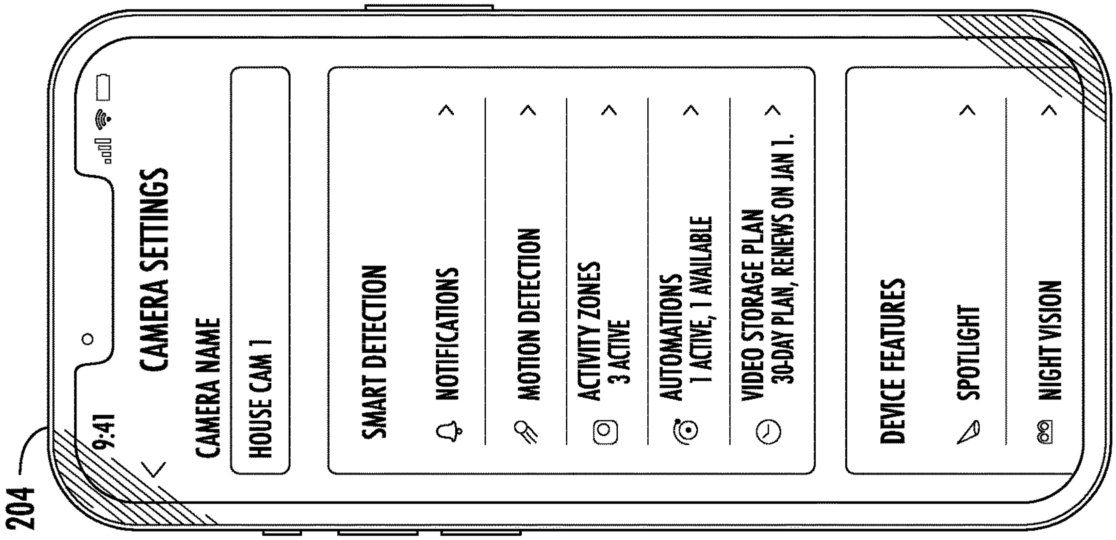
FIG. 10 is an example graphical user interfaces of a user device for controlling various aspects of the access control system of FIGS. 2 and 3 in accordance with example embodiments.
Figure 11:
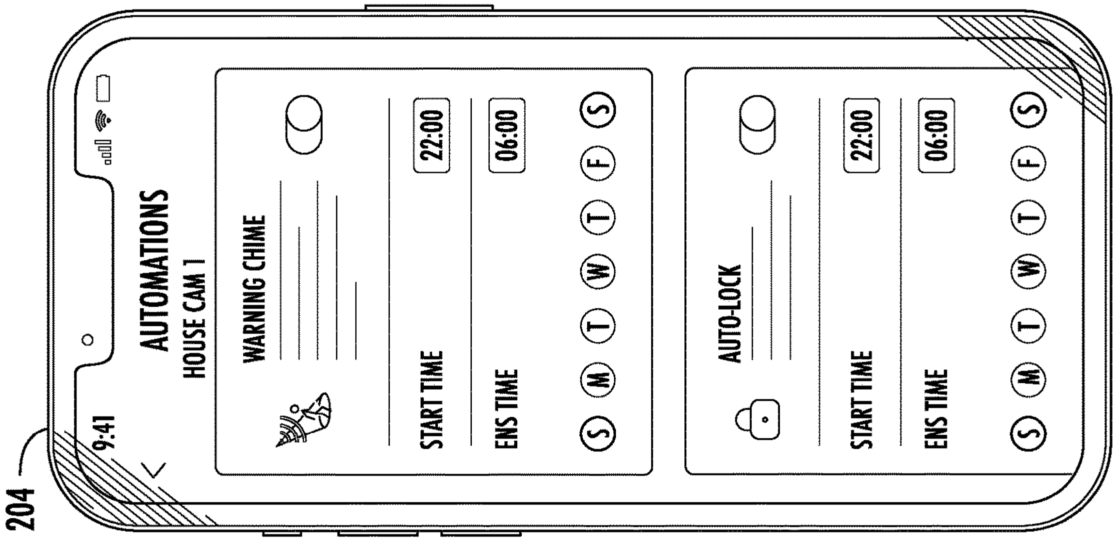
FIG. 11 is an example graphical user interfaces of a user device for controlling various aspects of the access control system of FIGS. 2 and 3 in accordance with example embodiments.
Figure 12:
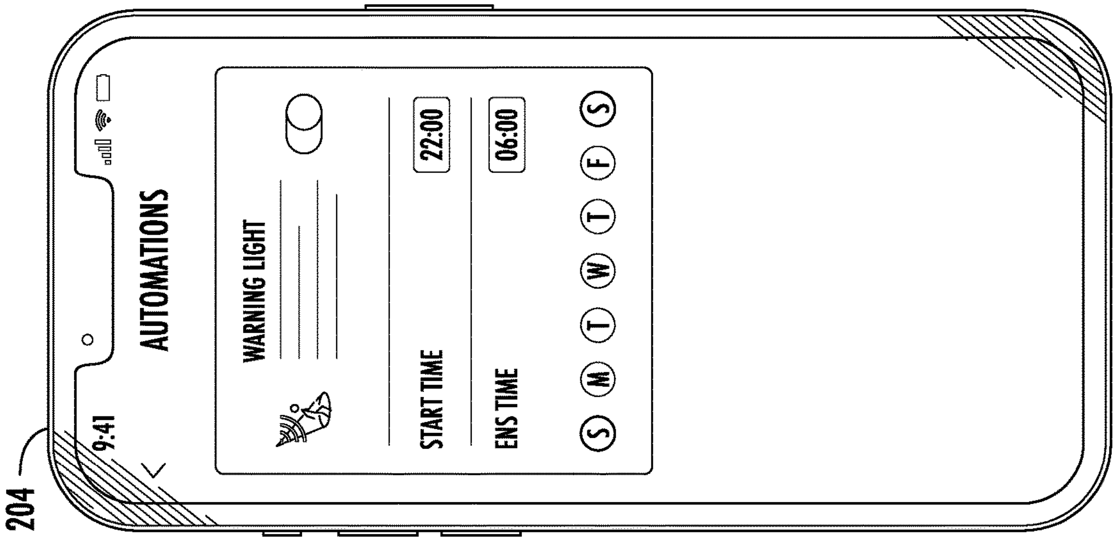
FIG. 12 is an example graphical user interfaces of a user device for controlling various aspects of the access control system of FIGS. 2 and 3 in accordance with example embodiments.

Second, FIG. 10 shows a settings page of the graphical user interface e.g. of the client application 228A and FIGS. 11 and 12 show an automation sub-menu of the camera settings e.g. of the client application 228A. As seen in FIGS. 11 and 12, the automation sub-menu can include options for time activating a chime output of the camera system 210, configurations options for the auto-lock operation (e.g. the auto-secure operation described in detail previously), and options for time activating warning lights (e.g. the spotlight 326 and/or the flood light 306).

Further aspects of the invention are provided by one or more of the following embodiments:

Embodiment 1. A method of initiating an auto-secure operation associated with a movable barrier operator, the method comprising: capturing, via a camera system, image data associated with a region of interest associated with the camera system; processing, via a processor, the image data to determine whether a person is present in the image data; transmitting a person detection signal from the processor to an access control platform component based on determining the person is present in the image data; formulating, by the access control platform component, a person detected notification in response to receiving the person detection signal; transmitting the person detected notification to a user device; and initiating, by the access control platform component in response to receiving the person detection signal, an auto-secure operation including sending a close command to a movable barrier operator to cause the movable barrier operator to close a movable barrier associated with the movable barrier operator.

Embodiment 2. The method of embodiment 1, further comprising setting the region of interest by: displaying, in a client application on a display of a user device, an image captured by the camera system; overlaying, on the display, an adjustable region of interest; and receiving user input adjusting a position of one or more adjustable nodes associated with the adjustable region of interest to define a perimeter of the region of interest.

Embodiment 3. The method of embodiment 2, wherein adjusting the position of the one or more adjustable nodes comprises dragging the one or more adjustable nodes on the display.

Embodiment 4. The method of any one of embodiments 2 or 3, further comprising translating a user defined location of the adjustable nodes into specific regions or pixel areas of an image sensor portion of the camera system, and storing the specific regions or pixel areas at the camera system, at a remote computing resource, or both.

Embodiment 5. The method of any one or more of the preceding embodiments, wherein the region of interest comprises a plurality of regions of interest each arranged to cover a different location within a secured area associated with the camera system.

Embodiment 6. The method of any one or more of the preceding embodiments, wherein capturing the image data is performed in response to detecting, by a motion input, motion in the region of interest.

Embodiment 7. The method of any one or more of the preceding embodiments, wherein initiating the auto-secure operation further comprises transmitting a lock command to a controllable lockset associated with an interior access door to cause the controllable lockset to lock the interior access door.

Embodiment 8. The method of any one or more of the preceding embodiments, further comprising: receiving, at the movable barrier operator, an open command prior to receiving the close command from the access control platform component; opening, by the movable barrier operator, the movable barrier in response to the received open command; disabling, by the access control platform component, closing of the movable barrier by the movable barrier operator for a predetermined time period after the movable barrier operator opens the movable barrier; and re-enabling, by the access control platform component, closing of the movable barrier by the movable barrier operator after the predetermined time period expires.

Embodiment 9. The method of embodiment 8, further comprising: sending, from the movable barrier operator or a sensor monitoring the movable barrier, a door opening state indicator to the access control platform component in response to the movable barrier beginning to open; and enabling, by the access control platform component, an auto-secure disable timer in response to receiving the door opening state indicator, the auto-secure disable timer measuring the predetermined time period.

Embodiment 10. The method of any one or more of the preceding embodiments, further comprising: receiving, at the access control platform component, a door unlocked state indicator associated with a controllable lockset associated with an interior access door; and disabling, by the access control platform component, the auto-secure operation for a predetermined time period in response to receiving the door unlocked state indicator.

Embodiment 11. A non-transitory computer-readable medium storing instructions which, when executed by a processor, cause performance of a method of initiating an auto-secure operation of a movable barrier operator, the method comprising: receiving, at an access control platform component, a person detection signal indicative of a person within a region of interest near a movable barrier operator, wherein the person detection signal is determined in view of image data captured by a camera system; initiating, by the access control platform component, an auto-secure operation upon receipt of the person detection signal, wherein initiating the auto-secure operation comprises: formulating, by the access control platform component, a person detected notification; transmitting the person detected notification to a user device; and sending a close command to the movable barrier operator to cause the movable barrier operator to close a movable barrier associated with the movable barrier operator.

Embodiment 12. The non-transitory computer-readable medium of embodiment 11, wherein initiating the auto-secure operation further comprises transmitting a lock command to a controllable lockset associated with an interior access door to cause the controllable lockset to lock the interior access door.

Embodiment 13. The non-transitory computer-readable medium of any one of embodiments 11 or 12, wherein initiating the auto-secure operation further comprises: disabling the auto-secure operation, by the access control platform component, for a predetermined period of time in response to receiving an open command, wherein the open command is configured to cause the movable barrier operator to open the movable barrier; and re-enabling the auto-secure operation, by the access control platform component, after termination of the predetermined period of time, wherein the movable barrier operator is restricted from closing the movable barrier to the closed position in response to receiving the close command while the auto-secure operation is disabled.

Embodiment 14. The non-transitory computer-readable medium of any one of embodiments 11, 12, or 13, wherein the method further comprises: receiving, at the access control platform component, a door unlocked state indicator associated with a controllable lockset associated with an interior access door; and disabling, by the access control platform component, the auto-secure operation for a predetermined time period in response to receiving the door unlocked state indicator.

Embodiment 15. The non-transitory computer-readable medium of any one of embodiments 11, 12, 13, or 14, wherein the region of interest comprises a plurality of regions of interest each arranged to cover a different location within a secured area associated with the camera system.

Embodiment 16. A camera subsystem for use with a movable barrier operator, the camera subsystem comprising: a camera system that receives a camera system input selected from a group including an environment input, a power input, an ambient lighting input, a visual input, an audio input, and a motion input; and a server subsystem, wherein the server subsystem comprises a processor coupled to memory, the processor configured to: process image data received from the camera system to determine whether a person is present in the image data; formulate a person detected notification in response to determining the person is present in the image data; transmit the person detected notification to a user device; and initiate, in response to receiving the person detection signal, an auto-secure operation including sending a close command to a movable barrier operator to cause the movable barrier operator to close a movable barrier associated with the movable barrier operator.

Embodiment 17. The camera subsystem of embodiment 16, wherein the camera system is configured to generate an output selected from a group including a night vision output, a visible light output, a sound output, and a status indicator.

Embodiment 18. The camera subsystem of any one of embodiments 16 or 17, wherein the camera system captures image data associated with a region of interest associated with the camera system, and wherein the region of interest comprises a plurality of regions of interest each arranged to cover a different location within a secured area associated with the camera system.

Embodiment 19. The camera subsystem of embodiment 18, wherein capturing the image data is performed in response to detecting, by a motion input, motion in the region of interest.

Embodiment 20. The camera subsystem of any one of embodiments 16, 17, 18, or 19, wherein the server subsystem is further configured to transmit a lock command to a controllable lockset associated with an interior access door to cause the controllable lockset to lock the interior access door in response to receiving the person detection signal.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A method of initiating an auto-secure operation associated with a movable barrier operator, the method comprising:

capturing, via a camera system, image data associated with a region of interest associated with the camera system, wherein the region of interest is external to a secured area bounded by a movable barrier movable between open and closed positions by a movable barrier operator;

processing, via a processor, the image data to determine whether an unknown person is present in the image data;

transmitting a person detection signal from the processor to an access control platform component based on determining the unknown person is present in the image data;

formulating, by the access control platform component, a person detected notification in response to receiving the person detection signal;

transmitting the person detected notification to a user device; and initiating, by the access control platform component in response to receiving the person detection signal, an auto-secure operation including sending a close command to the movable barrier operator to cause the movable barrier operator to close the movable barrier, wherein the access control platform component does not send the close command to the movable barrier operator when a known person is detected in the image data, and wherein the known person is identified based at least in part on entering the region of interest from the secured area.

2. The method of claim 1, further comprising setting the region of interest by:

displaying, in a client application on a display of a user device, an image captured by the camera system;

overlaying, on the display, an adjustable region of interest; and receiving user input adjusting a position of one or more adjustable nodes associated with the adjustable region of interest to define a perimeter of the region of interest.

3. The method of claim 2, wherein adjusting the position of the one or more adjustable nodes comprises dragging the one or more adjustable nodes on the display.

4. The method of claim 2, further comprising translating a user defined location of the adjustable nodes into specific regions or pixel areas of an image sensor portion of the camera system, and storing the specific regions or pixel areas at the camera system, at a remote computing resource, or both.

5. The method of claim 1, wherein the region of interest comprises a plurality of regions of interest each arranged to cover a different location.

6. The method of claim 1, wherein capturing the image data is performed in response to detecting, by a motion input, motion in the region of interest.

7. The method of claim 1, wherein initiating the auto-secure operation further comprises transmitting a lock command to a controllable lockset associated with an interior access door to cause the controllable lockset to lock the interior access door.

8. The method of claim 1, further comprising:

receiving, at the movable barrier operator, an open command prior to receiving the close command from the access control platform component;

opening, by the movable barrier operator, the movable barrier in response to the received open command;

disabling, by the access control platform component, closing of the movable barrier by the movable barrier operator for a predetermined time period after the movable barrier operator opens the movable barrier; and re-enabling, by the access control platform component, closing of the movable barrier by the movable barrier operator after the predetermined time period expires.

9. The method of claim 8, further comprising:

sending, from the movable barrier operator or a sensor monitoring the movable barrier, a door opening state indicator to the access control platform component in response to the movable barrier beginning to open; and enabling, by the access control platform component, an auto-secure disable timer in response to receiving the door opening state indicator, the auto-secure disable timer measuring the predetermined time period.

10. The method of claim 1, further comprising:

receiving, at the access control platform component, a door unlocked state indicator associated with a controllable lockset associated with an interior access door; and disabling, by the access control platform component, the auto-secure operation for a predetermined time period in response to receiving the door unlocked state indicator.

11. A non-transitory computer-readable medium storing instructions which, when executed by a processor, cause performance of a method of initiating an auto-secure operation of a movable barrier operator, the method comprising:

receiving, at an access control platform component, a person detection signal indicative of an unknown person within a region of interest near a movable barrier operator, wherein the person detection signal is determined in view of image data captured by a camera system, wherein the region of interest is external to a secured area bounded by a movable barrier movable between open and closed positions by a movable barrier operator;

initiating, by the access control platform component, an auto-secure operation upon receipt of the person detection signal, wherein initiating the auto-secure operation comprises:

formulating, by the access control platform component, a person detected notification;

transmitting the person detected notification to a user device; and sending a close command to the movable barrier operator to cause the movable barrier operator to close the movable barrier, wherein the access control platform component does not send the close command to the movable barrier operator when a person in the region of interest is a known person, and wherein the known person is identified based at least in part on entering the region of interest from the secured area.

12. The non-transitory computer-readable medium of claim 11, wherein initiating the auto-secure operation further comprises transmitting a lock command to a controllable lockset associated with an interior access door to cause the controllable lockset to lock the interior access door.

13. The non-transitory computer-readable medium of claim 11, wherein initiating the auto-secure operation further comprises:

disabling the auto-secure operation, by the access control platform component, for a predetermined period of time in response to receiving an open command, wherein the open command is configured to cause the movable barrier operator to open the movable barrier; and re-enabling the auto-secure operation, by the access control platform component, after termination of the predetermined period of time, wherein the movable barrier operator is restricted from closing the movable barrier to the closed position in response to receiving the close command while the auto-secure operation is disabled.

14. The non-transitory computer-readable medium of claim 11, wherein the method further comprises:

receiving, at the access control platform component, a door unlocked state indicator associated with a controllable lockset associated with an interior access door; and disabling, by the access control platform component, the auto-secure operation for a predetermined time period in response to receiving the door unlocked state indicator.

15. The non-transitory computer-readable medium of claim 11, wherein the region of interest comprises a plurality of regions of interest each arranged to cover a different location within a secured area associated with the camera system.

16. A camera subsystem for use with a movable barrier operator, the camera subsystem comprising:

a camera system that receives a visual input of a region of interest external to a secured area bounded by a movable barrier movable between open and closed positions by a movable barrier operator; and a server subsystem, wherein the server subsystem comprises a processor coupled to memory, the processor configured to:

process image data received from the camera system to determine whether an unknown person is present in the image data;

formulate a person detected notification in response to determining the unknown person is present in the image data;

transmit the person detected notification to a user device; and initiate, in response to receiving the person detected notification, an auto-secure operation including sending a close command to the movable barrier operator to cause the movable barrier operator to close the movable barrier, wherein the camera subsystem does not send the close command to the movable barrier operator in response to a known person being detected in the image data, the known person being identified at least in part based at least in part on a location of detection in the region of interest.

17. The camera subsystem of claim 16, wherein the camera system is configured to generate an output selected from a group including a night vision output, a visible light output, a sound output, and a status indicator.

18. The camera subsystem of claim 16, wherein the region of interest comprises a plurality of regions of interest each arranged to cover a different location.

19. The camera subsystem of claim 18, wherein capturing the image data is performed in response to detecting, by a motion input, motion in the region of interest.

20. The camera subsystem of claim 16, wherein the server subsystem is further configured to transmit a lock command to a controllable lockset associated with an interior access door to cause the controllable lockset to lock the interior access door in response to receiving the person detected notification.

* * * * *